Oct. 26, 1937.  A. T. HARRIS  2,097,062
SHAFT COUPLING
Original Filed June 5, 1936  3 Sheets-Sheet 1
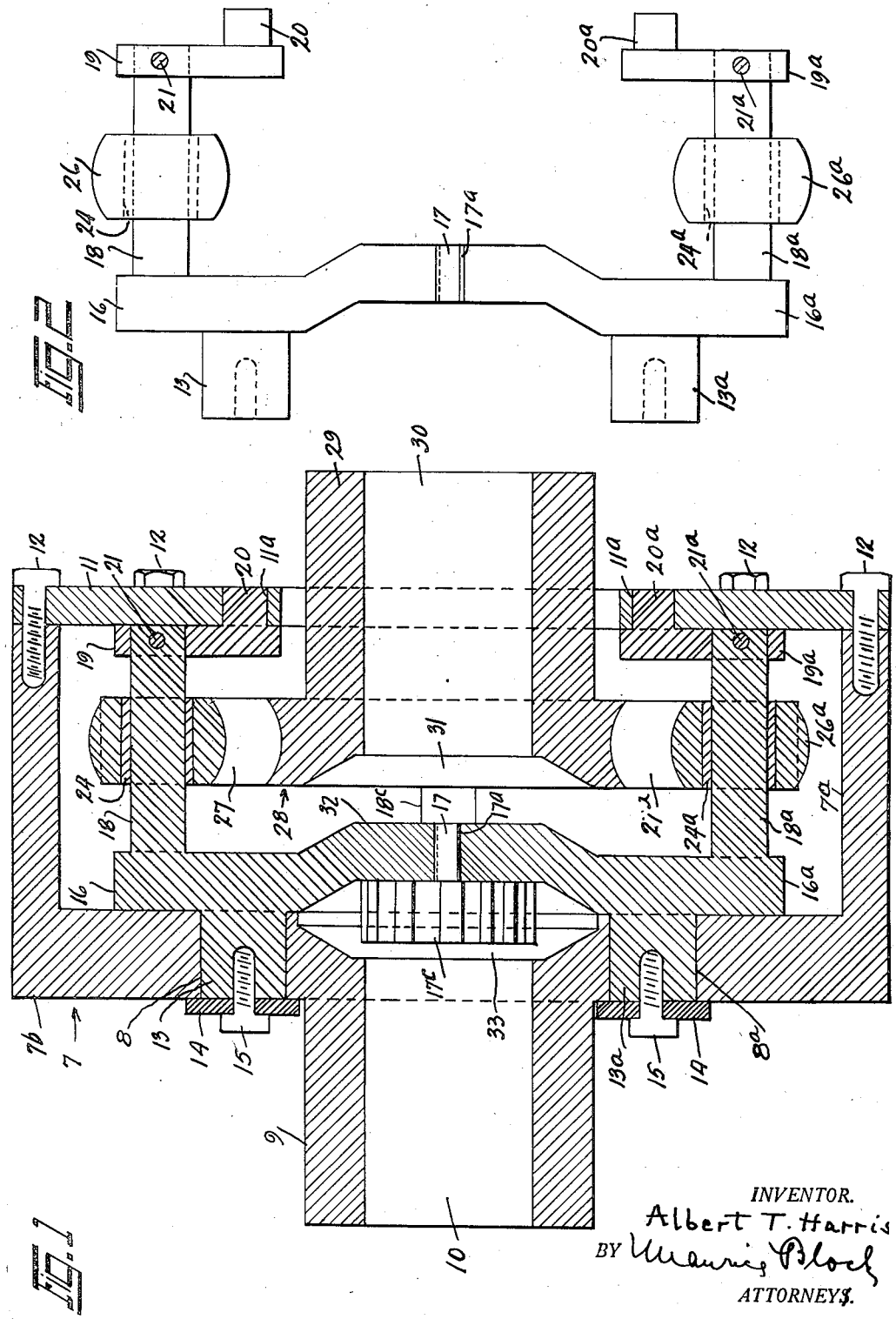
INVENTOR.
Albert T. Harris
BY Maurice Bloch
ATTORNEYS.

Oct. 26, 1937.　　　A. T. HARRIS　　　2,097,062
SHAFT COUPLING
Original Filed June 5, 1936　　3 Sheets-Sheet 2
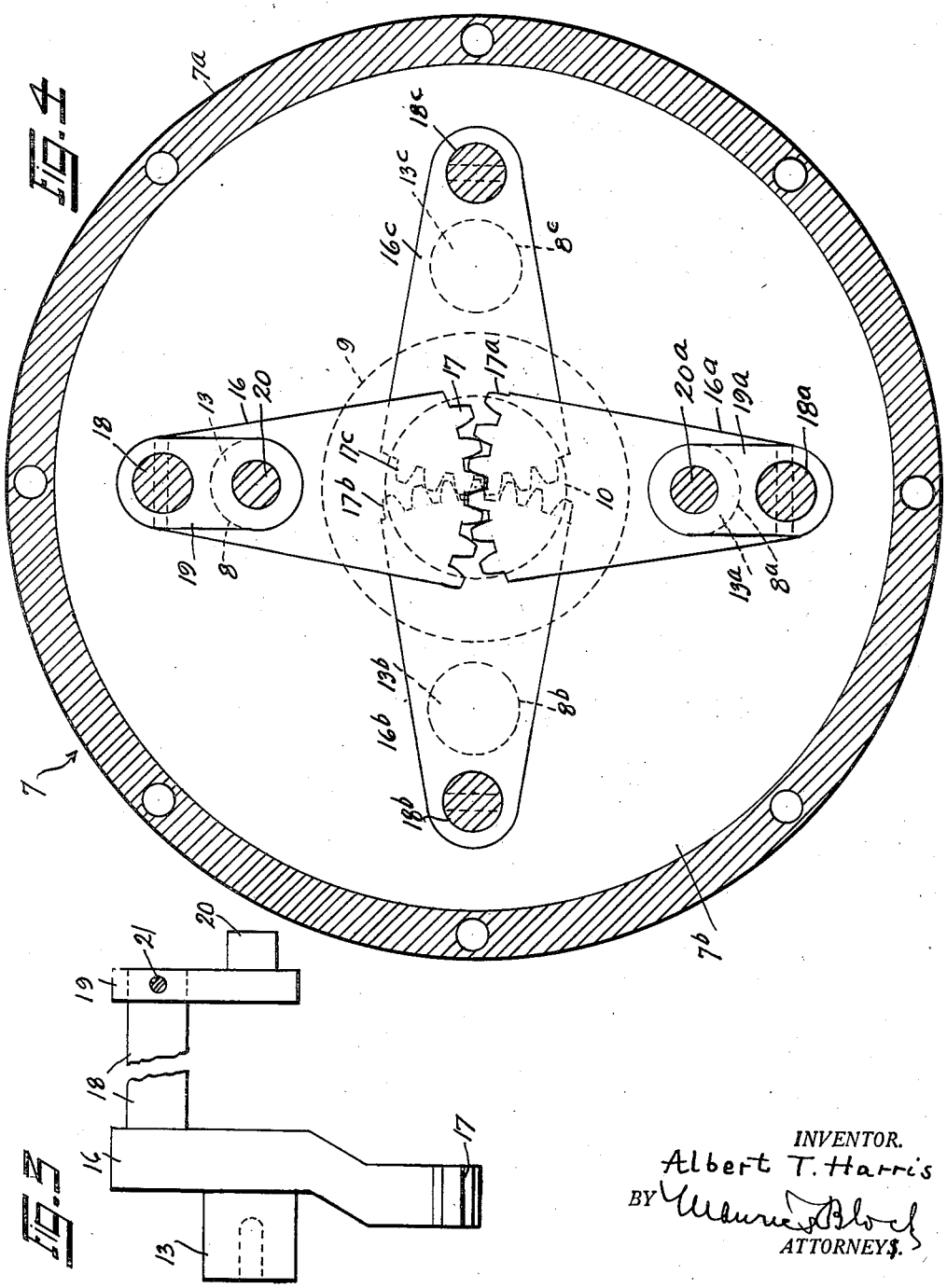
INVENTOR.
Albert T. Harris
BY Maurice Bloch
ATTORNEYS.

Oct. 26, 1937.  A. T. HARRIS  2,097,062
SHAFT COUPLING
Original Filed June 5, 1936 3 Sheets-Sheet 3
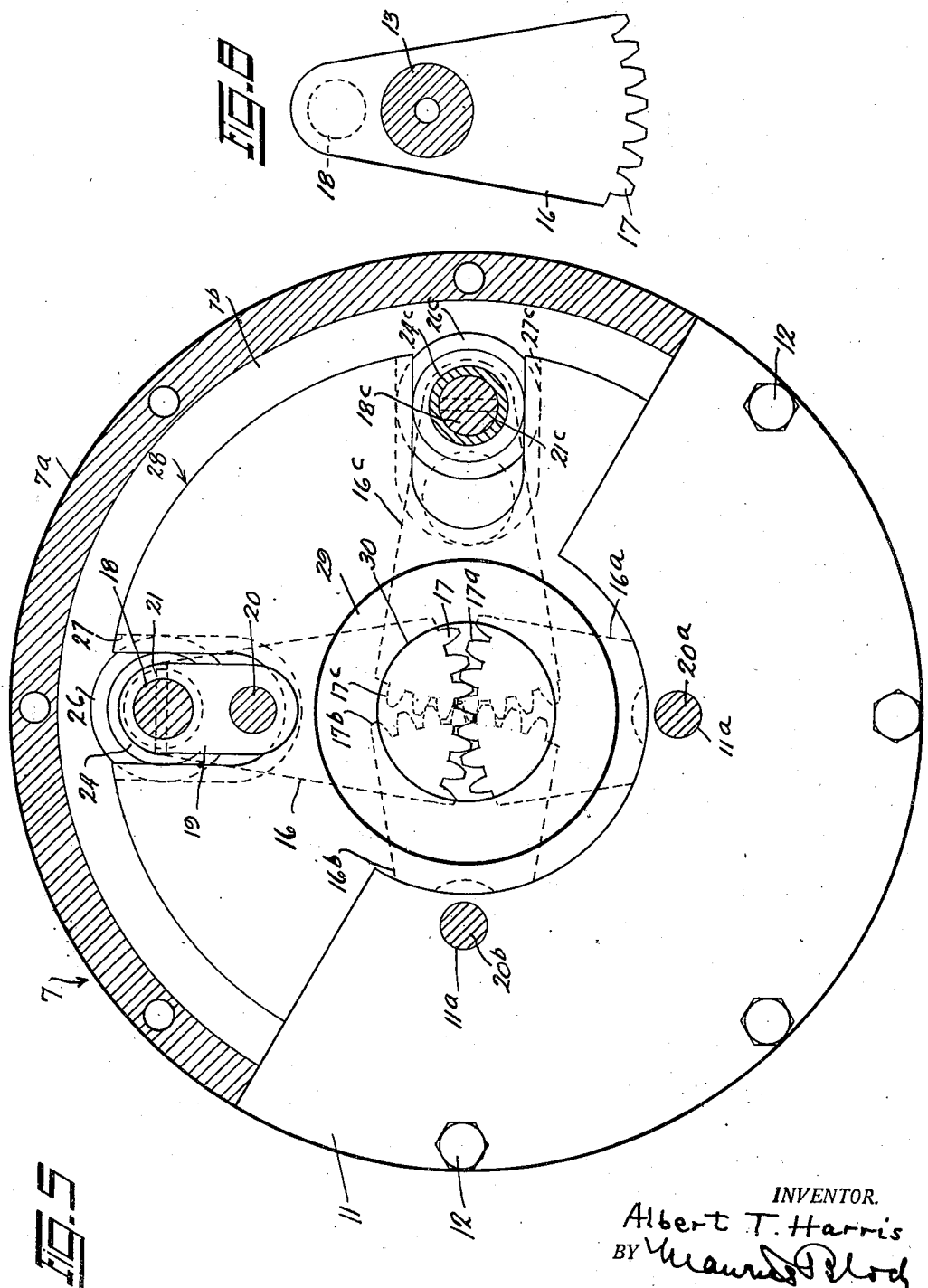
INVENTOR.
Albert T. Harris
BY
ATTORNEYS Patented Oct. 26, 1937

2,097,062

UNITED STATES PATENT OFFICE 2,097,062

SHAFT COUPLING

Albert T. Harris, New York, N. Y., assignor, by direct and mesne assignments, to Harris Coupling Co. Inc., a corporation of New York Application June 5, 1936, Serial No. 83,620
Renewed April 17, 1937

5 Claims. (Cl. 64—6)

This invention relates to shaft couplings and has for one of its objects the provision of such a device which when used to couple or join two shafts, the said shafts will run or rotate just as freely when out of alignment as they would rotate when in absolute alignment.

Another object of the invention is the provision of a device of this character which will accommodate or adjust itself to any change within given limits of the relative positions of the two shafts which it connects.

A further object of the invention is the provision of such a coupling which will be just as effective for coupling two shafts which are out of alignment but whose center lines cross, as for shafts which are out of alignment but the centers of which are parallel to each other.

A still further object of the invention is the provision of such a device comprising a pair of coupling members flexibly connected together by means of a plurality of gear segments, levers and rollers, so arranged as to produce a highly efficient coupling which may be used wherever two shafts are to be joined together.

Another object is to produce a device of the character described in which the maximum simplicity of construction and operation is secured.

Other objects and advantages will appear as the nature of the improvements is better understood, the invention consisting substantially in the novel arrangement and correlation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a longitudinal sectional view of one form of my improved shaft coupling;

Fig. 2 is a side view in elevation of one set of gear segments, levers and roller assemblies;

Fig. 3 is a similar view to Fig. 2 but of a single gear segment and lever assembly partly broken away;

Fig. 4 is a sectional view looking from the right of Fig. 1 with parts omitted from the section;

Fig. 5 is an end view partly in section looking from the right of Fig. 1; and

Fig. 6 is a side view partly in section of one of the gear segments looking from the left of Fig. 1.

Referring now to the drawings in detail, 7 indicates a coupling member in the form of a housing having an annular flange or wall $7^a$ rising from a base or wall $7^b$ provided with four holes 8, $8^a$, $8^b$ and $8^c$, spaced ninety degrees apart and is further provided with a hub or boss 9 having a central shaft-receiving bore 10. At the right-hand end of the housing there is secured to the flange $7^a$ a cover plate 11 by means of screws 12.

Pivotally extending into the holes 8, $8^a$, $8^b$ and $8^c$ are pins or extensions 13, $13^a$, $13^b$ and $13^c$ extending respectively from gear segments 16, $16^a$, $16^b$ and $16^c$. The segments 16 and $16^a$ are provided with gear teeth 17 and $17^a$ respectively which are in mesh and the segments $16^b$ and $16^c$ are provided respectively with intermeshing teeth $17^b$ and $17^c$. The various segment extensions or pins are maintained in their respective holes by means of washers 14 and screws 15 which are threaded into the said extensions.

The segment 16 has an extension or shaft 18 to which is secured at its free end a lever arm 19 by means of a pin 21, the said arm being provided with a pivot 20 pivotally mounted in a hole $11^a$ in the plate 11. The segments $16^a$, $16^b$ and $16^c$ are respectively provided with shafts $18^a$, $18^b$, and $18^c$, the same in all respects as the shaft 18. The free ends of the last mentioned shafts are provided with lever arms $19^a$, $19^b$ and $19^c$ which are secured respectively by pins $21^a$, $21^b$ and $21^c$ and are respectively provided with pivots $20^a$, $20^b$ and $20^c$ which extend into holes $11^a$ in the plate 11. The holes $11^a$ are drilled in alignment with the holes 8, $8^a$, $8^b$ and $8^c$ in the wall $7^b$.

Slidingly mounted on the shaft 18 is a bushing 24 which is driven into a crowned roller 26, the said roller having a sliding fit in a crowned slot 27 in a coupling member 28. The shafts $18^a$, $18^b$ and $18^c$ are provided respectively with bushings $24^a$ and rollers $26^a$, $24^b$ and $26^b$, and $24^c$ and $26^c$, similar to the bushings and rollers 24 and 26. The rollers $26^a$, $26^b$ and $26^c$ are in sliding engagement with slots $27^a$, $27^b$ and $27^c$ in the coupling member 28. The coupling member 28 is provided with a hub or boss 29 which has a central shaft opening 30 and a clearance depression 31 to clear the offset portions 32 of the segment sections 16 and 16ᵃ. A recess 33 is formed between the hub 9 and the segments 16 and 16ᵃ to permit proper operation of the gear segments 16ᵇ and 16ᶜ.

The operation of the device is as follows: The shaft which fits into the opening 10 delivers motion and power to the housing 7 and cover plate 11 which transfers same to the coupling member 28 through the shaft, roller and lever connections 18, 19, 26 and the similarly numbered parts having the coefficients a, b and c. If the driven shaft which fits into the opening 30 is in misalignment with the drive shaft in the hole 10 but parallel thereto, the said misalignment being to the right or left of the center shown in Figs. 4 and 5, then the gear segments 16 and 16ᵃ will have relative pivotal movement about their respective pivots 13 and 13ᵃ induced by the coupling member 28 exerting a pressure or force upon the shafts 18 and 18ᵃ through the rollers 26 and 26ᵃ. Similar results are obtained if the misalignment is up or down, the action taking place however between the gear segments 16ᵇ and 16ᶜ. If the misalignment is in both horizontal and vertical directions then the relative movement will take place between all of the gear segments.

If the misalignment is angular that is if the center lines of the drive and driven shafts cross each other then the rollers 26 and 26ᵃ will be slid in opposite directions on their respective shafts 18 and 18ᵃ. The same holds true of the rollers 26ᵇ and 26ᶜ with respect to their shafts 18ᵇ and 18ᶜ.

From the foregoing it will be seen that I have provided a simple yet efficient shaft coupling which can be used wherever two shafts are joined and which will operate as freely when the connected shafts are in or out of alignment with each other.

Having described my invention what I claim as new and desire to secure by Letters Patent is:

1. A shaft coupling comprising a coupling member, intermeshing gear segments pivotally mounted on the said coupling member, a second coupling member having slots therein, and rollers rotatably and slidably carried by the gear segments in operative engagement with the slots in the second coupling member for transmitting movement to the gear segments when the coupling members are out of alignment.

2. A shaft coupling, comprising a coupling member having a shaft-receiving bore therein, two pairs of intermeshing gear segments pivotally mounted on the said coupling member, a shaft carried by each segment above its pivot point, a second coupling member having a shaft-receiving bore and roller-receiving slots, and a slidably and rotatably mounted roller on each of the segment shafts in operative engagement with the slots in the second coupling member for transmitting movement to the gear segments when the coupling members are out of alignment.

3. A shaft coupling, comprising a coupling member having a shaft-receiving bore therein, two pairs of inter-meshing gear segments pivotally mounted on the said coupling member, a shaft carried by each segment above its pivot point, a plate secured to the coupling, a lever secured to each shaft and pivotally mounted on the plate, the pivots on the said levers being in alignment with the gear segment pivots, a second coupling member having a shaft-receiving bore and roller-receiving slots, and a slidably and rotatably mounted roller on each of the segment shafts in operative engagement with the slots in the second coupling member for transmitting movement to the gear segments when the coupling members are out of alignment.

4. A shaft coupling, comprising a coupling member having a shaft-receiving bore at one end thereof, an annular wall on the said coupling member, a plate secured to the wall at the end opposite to the shaft-receiving bore, a pair of intermeshing gear segments pivotally mounted on the coupling member, a second pair of intermeshing gear segments pivotally mounted on the coupling member, the said pairs of segments being disposed at right angles, a shaft carried by each segment above its pivot point, a lever secured to each of the shafts and pivotally mounted in the plate, the pivots on the said levers being in alignment with the gear segment pivots, a second coupling member having a shaft-receiving bore and roller-receiving slots, and a slidably and rotatably mounted roller on each of the segment shafts in operative engagement with the slots in the second coupling member for transmitting movement to the gear segments when the coupling members are out of alignment.

5. A shaft coupling, comprising a coupling member, intermeshing gear segments pivotally mounted on the said coupling member, an extension on each segment above its pivot point, a second coupling member having roller-receiving slots therein, and a slidably and rotatably mounted roller on each of the segment extensions in operative engagement with the slots in the second coupling member for transmitting movement from the first named coupling member to the second named coupling member.

ALBERT T. HARRIS.